Patented May 12, 1953

2,638,453

UNITED STATES PATENT OFFICE 2,638,453

ALKALINE EARTH FLUORIDE TREATMENT OF USED CRACKING CATALYSTS

Charles E. Starr, Jr., Don R. McAdams, and Julius P. Bilisoly, Baton Rouge, La., assignors to Standard Oil Development Company, a corporation of Delaware No Drawing. Application September 23, 1949, Serial No. 117,498

6 Claims. (Cl. 252—411)

This invention relates to processes for the conversion of hydrocarbons and more particularly relates to processes for reactivating or revivifying hydrocarbon conversion catalysts which have undergone degradation or loss of activity or selectivity after prolonged use, or for maintaining catalyst activity or selectivity during use.

Processes for the catalytic conversion or cracking of hydrocarbons are well known and the catalysts may be used as a fixed bed, moving bed, or in the form of a powder or spherical catalyst in the fluid technique or suspensoid process and the like.

During the conversion or cracking of hydrocarbons, there is a deposition of coke or carbonaceous material on the catalyst, and in the commercial operations the catalyst is regenerated by burning the coke with air or other oxygen-containing gas. The regeneration may be effected in other ways. After regeneration the catalyst is again used in another conversion or cracking operation. The cycles of a conversion followed by a regeneration are continued and after some time the catalyst loses some of its activity and also its selectivity. The loss in activity shows up when there is less conversion of the feed stock to desired products such as gasoline in the cracking process. Also as the catalyst becomes older and somewhat degraded, more coke and more gas are formed and this shows that some of the feed stock is being converted to undesirable products. When such catalyst produces more coke and more gas it is stated to have less selectivity.

Hereinafter this quality of the catalyst will be referred to by designating the carbon and gas producing effects as the relative carbon production factor (which will be referred to as RCF) and the relative gas production factor (which will be hereinafter referred to as RGF). The relative carbon production factor is defined as the ratio of the carbon produced by a catalyst being tested to that produced by a standard uncontaminated catalyst at the same conversion level. For a fresh uncontaminated catalyst the conversion is about 53% and the $D+L$ is about 50 whereas for an equilibrium used catalyst the conversion is about 22% and the $D+L$ is about 20 or lower. The RCF and RGF range from 1.0 for fresh catalyst to 1.5 to 2.0 or higher for equilibrium catalyst. The relative gas production factor is defined as the ratio of the amount of dry gas (cu. ft. per barrel of feed oil) produced by the catalyst being tested to the amount of dry gas produced by a standard uncontaminated catalyst at the same conversion level.

Equilibrium catalyst in a fluid unit may be generally described as follows. When fresh catalyst is first put in a cracking unit it has a relatively high activity but after it is in a unit for a while this activity drops off rapidly and substantially levels off at a lower activity but there is a general downward trend. Equilibrium catalyst is catalyst which has been in the unit for an extended period of time and which is being maintained at a substantially constant activity and selectivity by the addition of fresh make-up catalyst.

The activity of the catalyst is indicated by the amount of gas oil feed cracked or converted to other products and is designated as conversion on the basis of a standardized laboratory test. This test has been described in the chemical literature. (See Conn, M. E., and Connolly, G. C., Ind. Eng. Chem., 39, p. 1138, September 1947) and is carried on in a fixed-bed unit employing 200 cc. of pilled catalyst. The testing unit is referred to as a 200 cc. testing unit. The catalyst bed is in a reaction tube maintained at about 850° F. and the oil to be cracked (East Texas light gas oil in this case) is passed through this bed at a rate of 120 cc./hr. The cycle requires two hours during which 240 cc. of oil are cracked.

In the cracking operation, gases and coke are formed, as well as normally liquid hydrocarbons, with the coke being deposited on the catalyst. The cracked liquid product is examined for gasoline content in the ASTM D-86-46 distillation apparatus. The amount of gasoline distilled from a 100 cc. charge of the cracked liquid product at a vapor temperature of 400° F. is designated as distillate or D. The residual portion left in the flask is measured and is designated as R. The loss, or L, is determined by adding D and R and subtracting this total from 100. The sum of $D+L$, or distillate plus loss, is another criterion of activity and selectivity since it shows the yield of desirable product such as gasoline produced. The measure of conversion is obtained by subtracting the percentage of gas oil residual material (R) based on feed from 100.

Processes for the catalytic conversion or cracking of hydrocarbons are well known. In these processes liquid hydrocarbons, such as gas oil, reduced crude, whole crude, naphtha or the like, are contacted with active conversion catalysts at temperatures of from about 750° F. to 1100° F. for a period to give the desired conversion. These processes may utilize the catalyst in the form of a fixed bed, moving bed, or powdered catalyst using the fluidized technique. Also, catalysts may be used in suspensoid cracking and other related processes.

During operation of conversion processes especially in the fluid process where powdered catalyst or microspherical catalyst is circulated through the unit, the catalyst apparently becomes contaminated with metal or metal compounds such as iron, nickel, etc. and these contaminants reduce the activity of the catalyst and also cause the catalyst to produce more gas and coke than a fresh or uncontaminated catalyst. Also some of the contamination may come from the hydrocarbon feed stock. By reducing the gas and carbon made attributable to the contaminants during conversion or cracking considerable financial benefits due to increased yield of valuable products are realized and further a smaller amount of valuable feed stock is wasted by being converted to undesirable gas and coke.

In the conversion or cracking of hydrocarbons where coke or carbonaceous material is deposited on the catalyst, the regeneration of the catalysts effects the removal of coke by burning or some other means and this is generally referred to in the art as regeneration. In the present case, the treatment of the catalyst is a reactivation or rvivification and is different from the regeneration process. As above pointed out, after repeated conversions and regenerations the catalyst loses some of its activity and selectivity and the present reactivation treatment restores some or all of the activity and selectivity of the catalyst.

It has heretofore been suggested to add hydrofluoric acid to used catalyst and while beneficial results are obtained the results are not permanent due apparently to the loss of hydrofluoric acid after the addition of the hydrofluoric acid to the unit is stopped. While the mechanism of the reaction has not been established, one explanation is that the beneficial effect is a result of the chemical action of the fluorides with the iron or other contaminant and in this way the contamination is neutralized or minimized. In the present case a more stable compound such as calcium fluoride is used for its decontaminating effect of iron or other contaminants.

According to this invention the partially deactivated or used catalyst is treated with a solid inorganic non-vaporizable fluoride such as an alkaline earth fluoride or an alkali metal fluoride. These fluoride materials may be incorporated with the used catalyst in a number of ways.

It has now been found that catalysts such as synthetically prepared silica-alumina, silica-magnesia, silica-alumina magnesia, acid treated bentonites such as super filtrol and similar used catalysts that have suffered loss in activity and/or selectivity after a number of alternate hydrocarbons conversion operations such as cracking of gas oils to produce gasoline where coke is deposited on the catalyst and the catalyst is regenerated by burning, may have their activity and selectivity wholly restored or at least to some extent by treating the regenerated catalyst with an alkaline earth fluoride such as calcium fluoride or an alkali metal fluoride such as potassium fluoride. These fluoride materials are used in relatively small amounts preferably between about 0.1% and about 5% by weight on the catalyst. The treatment may be repeated when the catalyst activity and selectivity decline.

According to one method the dry calcium fluoride or barium fluoride or other alkaline earth fluoride or alkali metal fluoride is mixed in the dry state with the partially deactivated cracking catalyst and beneficial results are obtained. Where the fluorides are soluble in water or other ordinary solvents they may be used in solution for impregnating the used cracking catalyst.

In the following Table I are given data showing the beneficial effects of various fluorides on a silica-alumina catalyst.

In the specific example to be given presently the catalyst was a powdered catalyst taken from a commercial catalytic cracking plant and was a synthetically prepared silica-alumina catalyst containing about 13% alumina. The catalyst after mixing with certain fluorides as listed below was pilled into cylinders of about $\frac{3}{16}$" by $\frac{3}{16}$". The used catalyst had a relatively low activity and selectivity. The catalyst pills (200 cc.) were placed in a fixed-bed unit. East Texas gas oil was fed to the unit at a rate of 0.6 v./v./hr. and a 2-hour cycle was used. The oil was cracked at a temperature of about 850° F.

After a cracking cycle the catalyst was purged or stripped with nitrogen for about 30 minutes and was then regenerated with air diluted with nitrogen at a temperature of about 1050° F. Toward the end of the regeneration only air was passed through the catalyst bed. The regeneration for each cycle took about 8 hours.

Table I

[200 cc. unit data.]

|  | Untreated Regenerated Catalysts | Fluorine Compound Used, Amount Equivalent to 0.5% F | | |
|---|---|---|---|---|
| Compound Added | none | CaF$_2$ | KF | LiF |
| Wt. Percent of Compound Used | none | 1.03 | 1.53 | 0.68 |
| No. of cycles | 2 | 3 | 2 | 2 |
| D+L, Percent | 26.0 | 31.0 | 23.0 | 25.0 |
| RCF | 1.71 | 1.24 | 1.18 | 1.55 |
| RGF | 2.00 | 1.24 | 1.41 | 1.73 |

In the above table the calcium fluoride, potassium fluoride and lithium fluoride were added to the used or partially deactivated regenerated catalyst by dry-mixing at room temperature, the time of mixing being 2 hours. Although different amounts of the three fluorides were used the F equivalent used in each case was the same. The calcium fluoride treated catalyst was used for 3 cycles and the potassium fluoride and lithium fluoride treated catalyst were used for 2 cycles each.

In each cycle there was a cracking step, a stripping step and a regeneration step. In the above Table I it will be seen that the calcium fluoride treated catalyst improved the activity of the catalyst from 26% D+L to 31% D+L and increased the selectivity by reducing appreciably the RCF and RGF. While the potassium fluoride treated catalyst showed lower D+L, it showed a better selectivity than the untreated catalyst. The lithium fluoride treated catalyst was inferior to the others but gave some improvement in RCF and RGF. From these data it will be appreciated that the calcium fluoride treated catalyst is the preferred catalyst but that the potassium and lithium fluorides are useful even though not as good as the preferred catalyst.

The following data show the results of revivification of a different partially deactivated silica-alumina catalyst with barium fluoride and calcium fluoride.

TABLE II

[200 cc. unit data.]

|  | Untreated Regenerated Catalyst | 1% by Weight CaF$_2$ | 5% by Weight BaF$_2$ | 2.5% by Weight CaF$_2$ | 5% by Weight CaF$_2$ |
|---|---|---|---|---|---|
| No. of Cycles | 2 | 10 | 2 | 10 | 10 |
| D+L, Percent | 23.0 | 27.0 | 26.5 | 28.0 | 27.0 |
| RCF | 1.96 | 1.48 | 1.47 | 1.37 | 1.42 |
| RGF | 2.03 | 1.69 | 1.46 | 1.60 | 1.77 |

The barium fluoride and calcium fluoride in each case was dry mixed at room temperature with the used regenerated catalyst containing silica and about 13% of alumina for about 2 hours. From the above results it will be seen that the activity and selectivity of the catalyst were improved by the use of either CaF$_2$ or BaF$_2$. The untreated catalyst used in this series was of different origin than that used in Table I and also exhibited a greater degree of degradation from use as evidenced by the lower D+L and higher RCF than the catalyst of Table I. It will also be noted that a higher amount of CaF$_2$ was required to obtain a slightly less beneficial effect than that of the catalyst listed in Table I. Thus, it is observed that about 2.5% CaF$_2$ effected the maximum improvement in this particular catalyst and a further amount of CaF$_2$ (5%) effected no further improvement. In Table I, 1% CaF$_2$ effected a marked improvement in activity and selectivity. Barium fluoride appears somewhat poorer than calcium fluoride in activity improvement but about equal in selectivity improvement. The improvement in quality effected by the barium fluoride is however outstanding.

Instead of dry mixing the fluoride compounds with the partially deactivated catalyst, it is also possible to dissolve the fluoride compound such as KF, LiF in water and treat the used or deactivated catalyst with the solution, dry the treated catalyst if necessary and then use the treated catalyst.

Instead of the solid fluorides specifically enumerated other fluorides such as fluorides of strontium, magnesium, manganese, titanium, cobalt, zirconium may be used or combinations thereof. However, the calcium fluoride is the preferred treating agent for used catalysts. To produce the titanium fluoride or zirconium fluoride one method comprises dissolving titanium oxides or zirconium oxides in hydrofluoric acid.

As another alternative the hydrocarbon feed to a catalytic cracking unit is contacted at 450° to 600° F. with a relatively stable fluorine compound such as calcium fluoride. The fluoride in a powdered condition partially reacts with the iron contaminant in the feed and also a small amount of the fluoride is carried into the reactor with the feed. By this means the cracking catalyst is contacted with small amounts of calcium fluoride or other fluoride so that any unreacted iron contaminants are not so detrimental to the catalyst. Also the fluoride material may be added to the make-up catalyst.

What is claimed is:

1. A method of revivifying silica-alumina cracking catalyst which has been used in repeated hydrocarbon cracking and regeneration operations and which has become partially deactivated which comprises treating the partially deactivated catalyst with a small amount of an alkaline earth metal fluoride to add about 1-5% by weight of the alkaline earth metal fluoride to the cracking catalyst to improve the activity and selectivity of such catalyst.

2. A method according to claim 1 wherein the alkaline earth metal fluoride comprises calcium fluoride.

3. A method according to claim 1 wherein the alkaline earth metal fluoride comprises barium fluoride.

4. A method of revivifying synthetically prepared silica alumina and silica magnesia cracking catalyst which has been used in repeated hydrocarbon cracking and regeneration operations and which has become partially deactivated which comprises dry mixing about 1-5% by weight of an alkaline earth metal fluoride with the partially deactivated catalyst and then using it for further cracking and regeneration operations.

5. In a method wherein a silica-alumina catalyst is used for the cracking of hydrocarbons and is then regenerated after a cracking step for reuse in cracking and with such repeated cracking and regeneration steps the catalyst becomes partially deactivated, the improvement which comprises treating the partially deactivated catalyst with a small amount of an alkaline earth fluoride to add about 1-5% by weight of the alkaline earth metal fluoride to the catalyst to improve the activity and selectivity of such catalyst.

6. A method according to claim 5 wherein the alkaline earth fluoride is selected from the class consisting of calcium fluoride and barium fluoride.

CHARLES E. STARR, JR.
DON R. McADAMS.
JULIUS P. BILISOLY.

References Cited in the file of this patent

UNITED STATES PATENTS

| Number | Name | Date |
|---|---|---|
| 2,336,165 | Connolly | Dec. 7, 1943 |
| 2,430,735 | Ray et al. | Nov. 11, 1947 |
| 2,493,761 | Hughes et al. | Jan. 10, 1950 |